Figure 4:
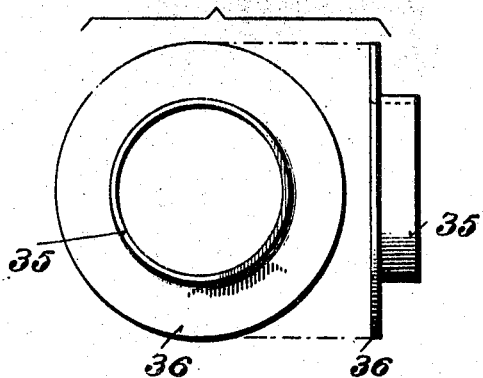

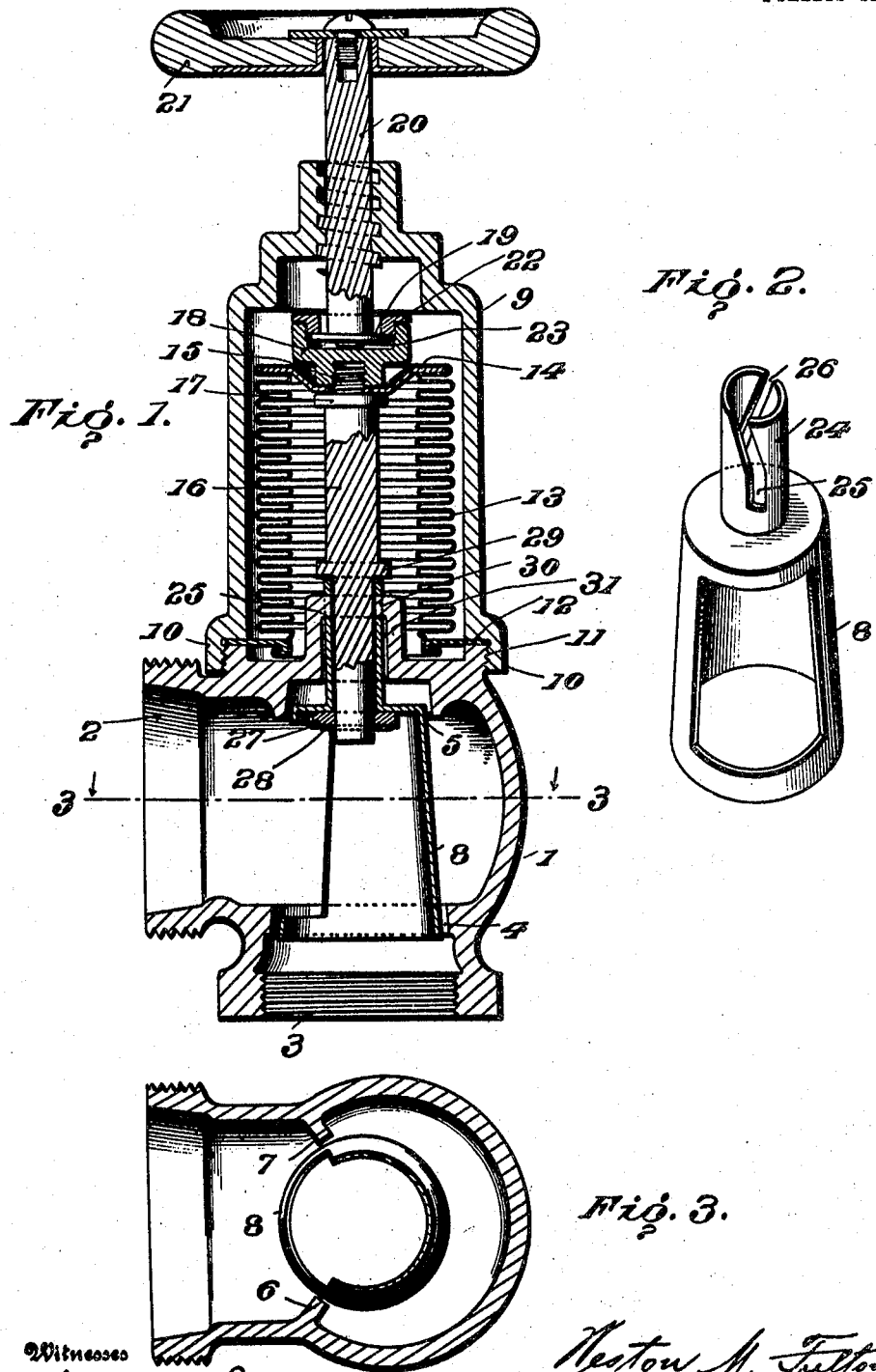

No. 894,429. PATENTED JULY 28, 1908.
W. M. FULTON.
VALVE AND VALVE CONSTRUCTION.
APPLICATION FILED JUNE 11, 1906.

2 SHEETS—SHEET 2.

UNITED STATES PATENT OFFICE.

WESTON M. FULTON, OF KNOXVILLE, TENNESSEE, ASSIGNOR TO THE FULTON COMPANY, OF KNOXVILLE, TENNESSEE, A CORPORATION OF MAINE.

VALVE AND VALVE CONSTRUCTION.

No. 894,429.             Specification of Letters Patent.           Patented July 28, 1908.

Application filed June 11, 1906. Serial No. 321,284.

*To all whom it may concern:*

Be it known that I, WESTON M. FULTON, of Knoxville, Tennessee, have invented a new and useful Improvement in Valves and Valve Construction, which invention is fully set forth in the following specification.

This invention relates to valves, particularly of the class commercially known as "quick opening valves" which are employed for controlling the flow of heated liquids through a system of piping where the movement of the liquid is due to convection, and to means for permitting movement of the valve stem in valves of the kind referred to, without the use of packing, and the invention further relates to securing the ends of the corrugated walls to the valve stem and casing by an improved method of brazing without injuring the resiliency of the corrugations of the wall in the vicinity heated during the brazing operation.

It has heretofore been proposed to avoid the use of a stuffing-box in steam or hot water valves by substituting therefor a flexible partition either flat or in the form of a cup provided with folds, the cup forming a flexible corrugated partition between the steam or hot water space within the valve and the space around the valve stem outside the steam or water space. The corrugated partition in such valves as heretofore constructed has been subject to shearing strains by the turning of the valve stem which soon weakened the partition where it is connected with the valve stem and casing, thereby causing the partition to crack and leak. A further objection to the use of a cup partition with corrugated side walls resides in the fact that such a construction is difficult to make, and when made, the metal of the bottom of the cup having been thinned out in the operation of corrugating, is unable to long withstand repeated bending strains without giving way at such weakened points. It has also been found inexpedient to secure the open end of such a cup to the valve casing because of the difficulty of making a flange on such end without seriously thinning out and weakening the metal at such flange during its formation. Furthermore, valves in which flexible partitions have been substituted for stuffing boxes have only permitted a reciprocating movement of the valve itself, and thereby limited the use of such corrugated walls to a particular class of rectilinear moving valves wherein the movement of the valve towards its seat is comparatively slow and not suited for quick action valves.

The present invention has therefore among its objects to secure a water-tight joint about the valve stem, particularly in quick opening valves, by means of expansible and collapsible corrugated metal walls, while at the same time avoiding the objections above noted as heretofore pertaining to such constructions; to secure compactness of structure by reducing the dimensions of the collapsible and expansible vessel without detracting from the flexibility of the corrugated walls; to secure durability in the walls, particularly where the ends of the walls are made fast to the casing and valve stem by brazing without sacrificing the elasticity in the neighboring corrugations by over-heating during brazing; to secure ease and rapidity of operation of the valve in its casing, together with other objects which will more clearly appear in the detailed description.

The invention briefly stated consists in providing a valve stem in a valve of the kind above referred to with a collapsible and expansible corrugated tubular wall the corrugations of which are preferably formed on the lines laid down in my application Sr. No. 217,287, filed July 19, 1904, whereby the greatest flexibility and durability in the wall is secured. The ends of the corrugated tube are open, and the walls at the ends of the tube are uncorrugated for a short distance to secure in these parts the thickness and strength of the original tube. To these plain ends are secured, preferably by brazing in the manner hereafter described, thick metal flanges or washers which enable the ends of the flexible tube to be clamped fast to the valve stem and to the valve casing. This manner of securing the ends of the flexible tube is an important feature of my invention, as it materially increases the durability and efficiency of the separating wall. To avoid shearing strains in the corrugated wall when operating the valves, the valve stem is made in two parts, one member of which has a rotary and rectilinear movement, and the other member a rectilinear movement only, which latter imparts to the valve a rapid turning in its casing to open and close the valve passages. Means are also provided for retracting the valve from its seat before turning of the valve to thereby facilitate ease of action and reduce friction and wear on the bearing surfaces of the valve.

In order that the invention may be more readily understood, certain mechanical expressions of the inventive idea involved are shown in the accompanying drawings, which are designed merely as illustrations to assist in the description of the invention, and not as defining the limits thereof.

Figure 5:
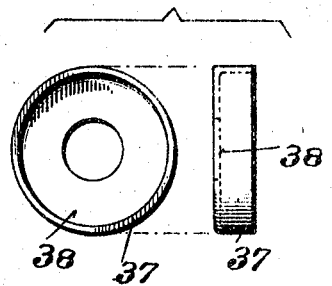
Figure 6:
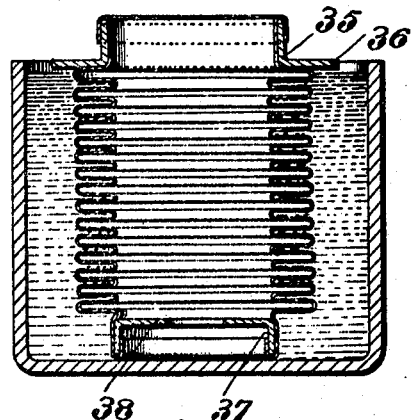
Figure 7:
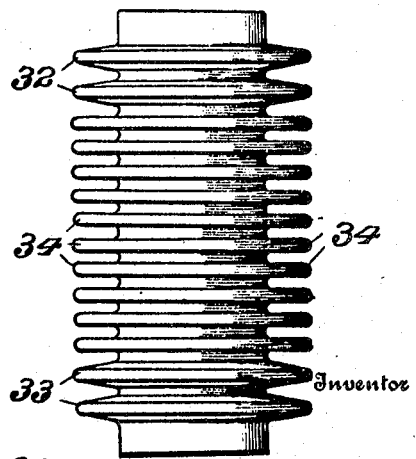

In said drawings, Figure 1 is a view in vertical section illustrating an embodiment of my invention, Fig. 3 being a transverse section taken on line 3—3 of Fig. 1; Fig. 2 shows the cone-shaped valve cup in perspective; Figs. 4, 5 and 6 are views showing details in the process of brazing; and Fig. 7 is a view in elevation of an extended wall.

Referring to Figs. 1, 2 and 3, I have therein shown an angle valve casing 1 of the radiator type having an exteriorly threaded member 2 suitable to receive a union coupling and a member 3 internally threaded to receive the end of a pipe. Within the valve casing is formed a conical valve seat having a lower seating surface 4 and a separate upper seating surface 5 preferably smaller but similar to the former. Two seating ribs 6 and 7 having their inner faces in the plane of the cone of which the valve seats 4 and 5 are a part, coöperate with said seats in receiving the conical valve cap 8 when the latter is lifted into seating position.

In place of the usual valve packing, I have arranged a cap 9 having a threaded lower terminal 10 engaging a threaded projection 11 formed on the upper part of the casing wall 1 and holding between itself and said projection an annular flange 12, brazed or otherwise sealed to the end of a corrugated wall 13 of flexible metal, preferably of brass or copper, and in a manner to be described hereinafter. The wall 13 is shown as cylindrical, though it may be of other shapes, is open at its lower extremity into the space within the valve casing, and at its upper end is closed by a rigid end wall 14. The center of flange 14 is provided with a central opening through which passes the reduced threaded portion 15 of the valve stem 16 having thereon a flange projection 17 to rest against the underside of the rigid end wall 14. Engaging threaded member 15 is a recessed nut 18 which, when screwed down, securely holds the end wall 14 against the flange or shoulder 17 on the valve stem 16 to hermetically close the end of the collapsible and expansible vessel. In the top face of nut 18 is an interiorly threaded recess in which is revolubly secured a head 19 on the end of a threaded valve operating rod 20 having a handle 21. The head 19 may be made integral with the rod 20 or separable therefrom, in which latter case it will be provided with means for securing it to the end of the rod. In order that the frictional contact between the face of nut 18 and the end of rod 20 may be restricted, the end of the rod is tipped with a rounded projection 23 which permits the rotation of the head 19 in its retaining socket without imparting any appreciable torsion strain to the corrugated wall 13 which is preferably made of thin metal. Where the rod 20 passes through the top of the cap 9, it is provided with a raised left-handed thread for purposes that will appear later.

The valve cup 8 consists of a frusto-conical wall having a rectangular opening in its side, an opening in its base, and a closure at its top, except at the central portion where the top wall is provided with a hollow cylindrical hub 24 having oppositely disposed cam slots 25, 26 in its walls. The lower portion of each of these slots is parallel to the axis of the hub, whereas the upper portion of each inclines from the axis in the direction of the threads of a left-handed screw. The valve cup 8 is supported on the end of the stem 16, and is held in place between two washers, one preferably integral with the valve stem constituting the shoulder 29 and the other a removable washer 27 held on the stem by a cotter pin 28. Engaging the two cam slots 25, 26 are two actuating lugs 30 arranged on opposite sides of the hub, and formed on the ends of arms 31 extending from the casing wall 1.

The operation of the valve as thus far described is as follows: The parts having been assembled, assume that the valve is in open position as shown in Fig. 1, and it is desired to close it. The handle 21 is given a rotation to the right, and by reason of the left-handed screw thread on the rod 20, the latter is raised carrying with it the valve stem 16 and the flexible wall 13, which latter cuts off communication of the space within the casing wall 1 and the exterior while permitting freedom of motion of the valve stem. Owing to the swivel connection between the valve actuating rod 20 and the valve stem 16, the rotation of the rod 20 is incapable of applying injurious twisting strains to the flexible wall 13, thereby materially protecting the wall from injury, particularly where the end of the wall is secured to the end plate. In the open position of the valve, the cup 8 is at its lower position, and has its walls out of contact with the cone valve seat 4, 5 and ribs 6, 7, while the cam grooves 25 and 26 have their upper portions resting against the actuating lugs 31. The vertical movement of the valve stem referred to above will cause the lower faces of the cam grooves to bear against their respective lugs 31, and thereby cause a rapid rotation of the valve cup to the left, the stem 16 having no appreciable tendency to rotate since the hub 24 of the cup is free to slip on the valve stem, and the walls of the cup are out of contact with the valve seat. When the end of the inclined portion of the cam groove is reached by the upward movement of the stem, the valve cup is in position to close communication between the two connections 2 and 3 by a further movement of the valve stem. The entry of the lugs 31 into the vertical portion of the cam slots prevents further rotary movement of the cup which is now moved to seating position by a rectilinear movement only. It will also be observed that in unseating of the valve the flexible wall is protected from torsional strains since the first movement of the valve cup is also rectilinear.

The construction whereby the flexible wall is protected from injurious torsional strains during the seating and unseating of the valve is one of the important features of my invention.

In the construction above described no special provision is needed for the escape of air from the space between the walls 9 and 13, since the air therein confined will find an exit past the screw threads of the rod 20.

It is desirable in valves of the class above referred to, which are more frequently used on steam and hot water pipes to make them of a metal that does not readily rust or corrode, such as brass or copper. To secure compactness of structure, the collapsible wall is made of small diameter, and it is essential in securing the necessary flexibility in such a wall that the corrugations be deep and the thickness of the walls be as thin as possible. Difficulty has heretofore been experienced in attaching the ends of the flexible wall to its supports without seriously interfering with the resiliency of the metal and weakening the wall at the points of attachment, and thereby resulting in breaking of the wall at this point, and rendering the valve useless after a short period of use. To overcome this objection, I have devised a method and means for attaching the ends of the corrugated wall to its supports.

To obtain a gas or water-tight joint where the ends of the wall connect with their supports, brazing is usually resorted to. The heat required for this operation anneals the metal in the extreme end corrugations, with the result that when the wall is either extended or contracted these end corrugations are not able to resist bending to the same extent as do the central corrugations which are in possession of their original elasticity. In Fig. 7 is illustrated the effect of annealing the metal in the end corrugations and then extending the wall lengthwise. The corrugations 32, 33 having less elasticity than the central corrugations 34, offer less resistance to the extension force, and open out wider and also close nearer together when force is applied to the wall to collapse it. The end corrugations are therefore subjected to greater bending strains and are the first to give way and crack.

To secure the advantages of brazing or soldering and avoid the annealing effects on the corrugations, I provide a receptacle containing a liquid such as water, into which the corrugated wall may be immersed, leaving only a small portion of the uncorrugated wall exposed to which the part to be attached by brazing is affixed. Heat can now be applied to the parts exposed out of the liquid sufficient to effect the brazing while the parts of the structure beneath the liquid are protected and are not injuriously affected. In applying the method to the flexible walls for valves, I preferably leave the ends of the wall uncorrugated, as shown in Fig. 6. Over one uncorrugated end a sleeve 35 of heavy metal having a flange 36 is slipped, and the protecting end of the uncorrugated wall is swaged or bent over the end of the sleeve. Solder or brazing material is applied and the seam heated by a circular burner, or by a heating current to soften the cementing material. The collar portion formed by the sleeve 35 and the plain end of the wall may now be bent over onto the flange 36 by means of a swaging die or other means. In a similar manner, a sleeve 37 having an interior flange 38 is applied to the opposite uncorrugated end, except that the sleeve is placed inside the wall.

The flanged sleeves 35 and 37 have an important function in further protecting the life of the flexible wall. To secure the desired flexibility in the wall, the depth of the corrugations are made as deep as consistent with strength. Further attenuation of the metal at the ends of the tubular wall to make an integral flange as heretofore practiced, weakens the wall at its points of attachment where the bending strains are the greatest. By the use of heavy flanged sleeves sealed to the uncorrugated ends of the flexible wall in the manner above described, very strong and efficient means of attaching the ends of the wall to its support are secured and the necessity of forming an integral thinned and weakened flange to extend beyond the corrugations of the tubular wall, is avoided.

What I claim is:

1. In combination, a valve casing, a rectilinear movable valve stem having a revoluble valve thereon, means actuated by said stem for rotating said valve when out of seating position, a collapsible and expansible wall having an end closure fast to said stem, and means imparting rectilinear motion to said stem.

2. In combination, a valve casing, a valve stem, a collapsible and expansible wall having an end closure fast thereto, means imparting rectilinear movement to said wall, a valve having a hollow hub provided with a cam slot, stationary means engaging said slot to rotate the valve when the latter is in unseated position and to restrain the said movement when the valve enters and leaves the seating position.

3. In combination, a valve casing having a double cone seat and connecting seating ribs, a conical cup valve having a side opening therein and a hollow hub provided with a cam slot, a rectilinear movable valve stem for revolubly supporting said cup valve, an expansible and collapsible wall having an end closure fast to said stem, and means imparting rectilinear movement to the same, and stationary means engaging said cam slot to rotate the valve when the latter is in unseated position and to restrain the said movement when the valve enters and leaves the seating position.

4. In combination, a valve casing, a rectilinear movable valve stem having a revoluble valve thereon, means actuated by said stem for rotating said valve when out of seating position, a collapsible and expansible wall having an end closure fast to said stem, and a rod having a revoluble connection to said valve stem for imparting rectilinear movement to said stem and wall.

In testimony whereof I have signed this specification in the presence of two subscribing witnesses.

WESTON M. FULTON.

Witnesses:
E. T. MANNING,
PAUL MANKER.